May 21, 1968 W. M. ISBRANDTSEN 3,384,106

DUAL-PURPOSE SHIPPING CONTAINER FOR DRY AND LIQUID CARGO

Filed Jan. 21, 1966 2 Sheets-Sheet 1

INVENTOR.
WALDEMAR M. ISBRANDTSEN
BY
ATTORNEY

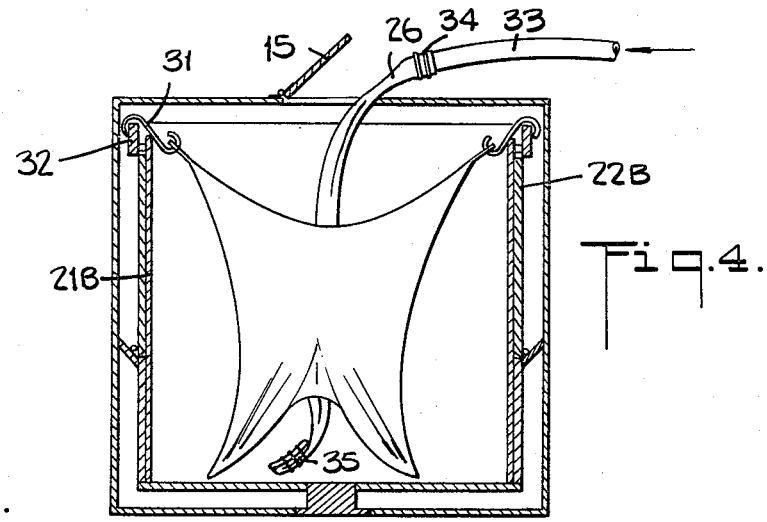
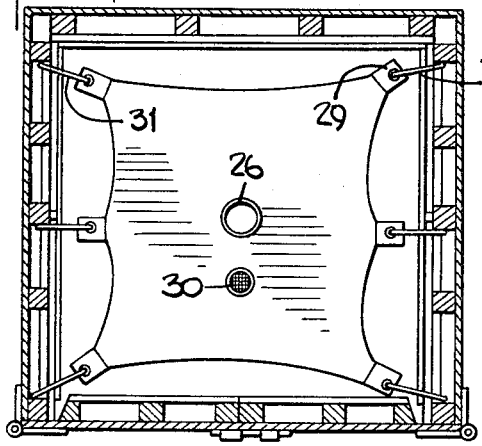
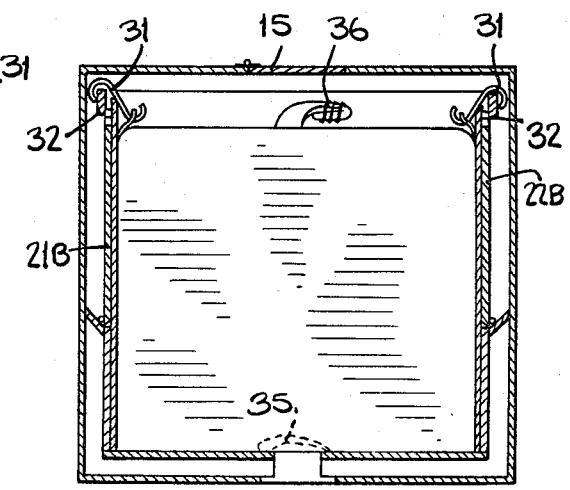
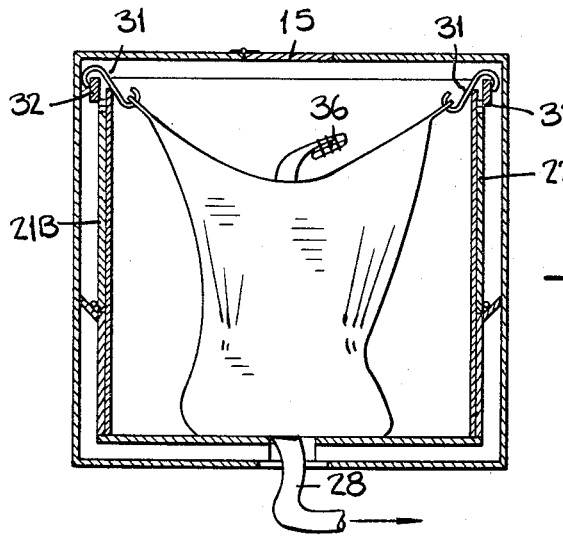

United States Patent Office 3,384,106
Patented May 21, 1968

3,384,106
DUAL-PURPOSE SHIPPING CONTAINER FOR DRY AND LIQUID CARGO
Waldemar M. Isbrandtsen, New York, N.Y., assignor to American Export Isbrandtsen Lines, Inc., New York, N.Y., a corporation of New York
Filed Jan. 21, 1966, Ser. No. 522,230
7 Claims. (Cl. 137—269)

This invention relates generally to shipping containers, and more particularly to a dual-purpose container adapted to hold and transport a dry or liquid cargo, the container being constituted by a rigid box in combination with a removable flexible bag.

Existing methods of loading, handling and unloading cargo are generally inefficient and costly, and require specialized equipment at points of transfer. In recent years, containerized ships have been developed which are adapted to transport dry-bulk or packaged cargo held in specially designed containers. These containers are provided with loading and dumping hatches so that they may be filled with a dry bulk commodity, such as rice or coffee, at a warehouse or processing plant. The containers are then transported by rail or truck to the dock-side where they are loaded onto the ship. This does away with the need for special holds or tanks in the ship and for elaborate loading and unloading procedures, for the cargo remains in the container and is transported therein until it reaches its ultimate destination.

The transportation of liquid loads represents a more difficult problem, for while it is possible to transport liquid, such as oil or acid in tanks or cannisters, such cannisters have a relatively small capacity and require special handling procedures. Moreover, if the ship is containerized and is adapted to carry a dry-bulk load in containers, the same ship is ordinarily not suited for liquid loads unless facilities are provided for this purpose.

If a dry cargo is transported to one destination in special containers, such containers must ordinarily return empty unless on the return voyage, there is also a dry cargo to be transported. This is highly wasteful of space, for if the outgoing cargo is dry and the return cargo is wet, existing containers can only serve for holding dry cargo.

Accordingly, it is the main object of this invention to provide a dual-purpose shipping container capable of carrying either a liquid or a dry load to afford fully co-ordinated and compatible transportation service as well as optimum door-to-door transportation efficiency.

More specifically, it is an object of this invention to provide a dual-purpose container constituted by a box in combination with a removable plastic bag, the box being hopperized when used with a flowable dry cargo, and being de-hopperized when used with a wet cargo, to accommodate said bag. The container when de-hopperized, can also be used for a packaged dry cargo.

Briefly stated, these objects are attained in a dual-purpose container constituted by a box having a loading hatch and a dumping hatch, as well as a retractable internal hopper which in its operative position registers with the dumping hatch and in its inoperative or de-hopperized position, forms the side walls of the box, a removable bag of flexible material being provided which when the box is de-hopperized, can be suspended therein to accommodate a liquid load, the bag having an inlet spout which is accessible through the loading hatch, and a discharge spout accessible through the dumping hatch.

For a better understanding of the invention, as well as other objects and further features thereof, reference is made to the accompanying drawing wherein like elements in the figures are designated by like reference numerals. In the drawing:

FIG. 4 is a transverse section taken through the container, showing how the bag is suspended therein in the de-hopperized box prior to loading;

FIG. 5 is a plan view of the suspended bag within the box;

FIG. 6 shows the bag when it is filled; and

FIG. 7 shows the bag as the liquid load is being discharged therefrom.

Figure 1:
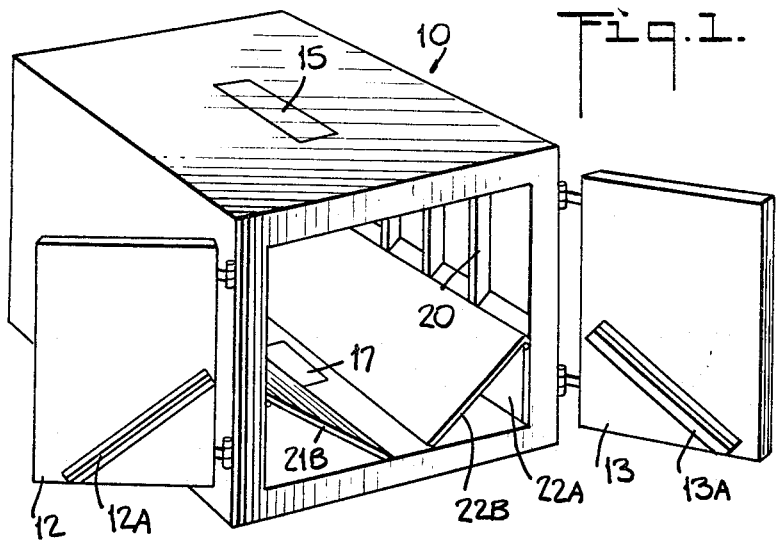
FIG. 1 is a perspective view of a dual-purpose shipping container in accordance with the invention, the container box being hopperized to function with a dry load.
Figure 2:
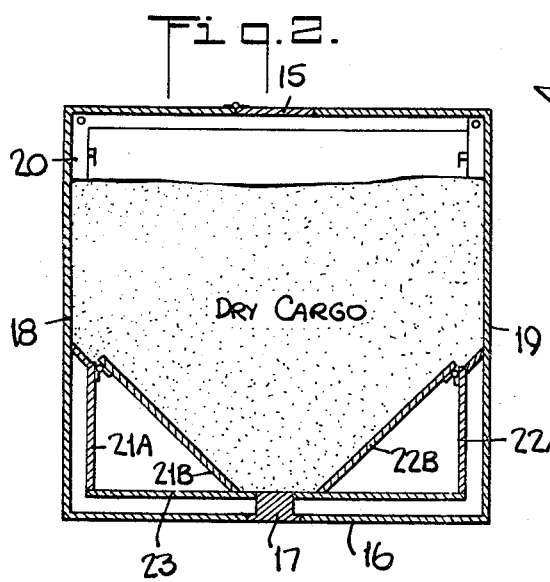
FIG. 2 is a transverse section taken through the hopperized box when it is filled with a dry load.
Figure 3:
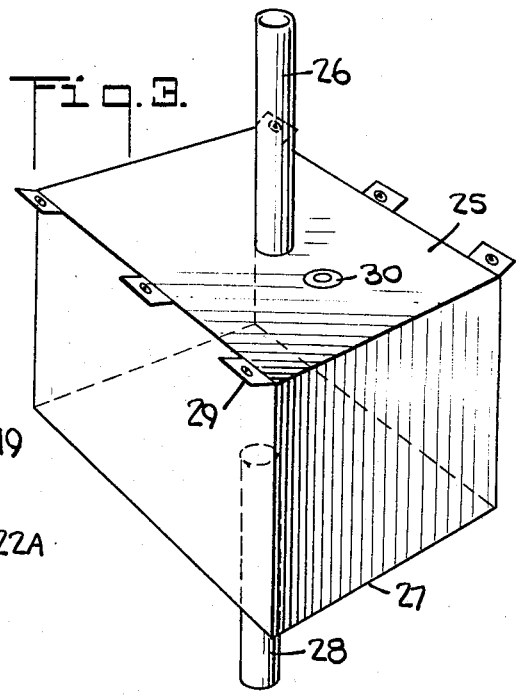
FIG. 3 shows in perspective the plastic bag for holding a liquid load within the box.

Referring now to FIGS. 1, 2 and 3, a dual-purpose container in accordance with the invention is constituted by a rectangular box, generally designated by numeral 10, and a removable flexible bag, generally designated by numeral 11, which when the container is used for liquid loads is suspended within the box.

Box 10 is provided with a pair of doors 12 and 13 which are hingedly connected to the front end thereof. The top panel 14 of the box includes a loading hatch 15, while the bottom panel 16 includes a dumping hatch 17. The side panels 18 and 19 are reinforced by vertical ribs 20 and mounted against these ribs are interior walls 21 and 22 made of bottom fixed sections 21A and 22A, respectively, and swinging upper sections 21B and 22B, respectively, hingedly connected to the fixed sections and acting as a retractable hopper.

In FIGS. 1 and 2, swinging sections 21B and 22B are shown inclined against the bottom wall 23 to define a hopper 24 which is aligned with the dumping hatch 17. Thus when the box is to be used for a dry bulk cargo such as rice, the swinging sections 21B and 22B are lowered to form the hopper. Doors 12 and 13 are provided with inclined ribs 12A and 13A which, when the doors are closed, abut the edges of the swinging sections 21B and 22B in order to buttress the same. The dry load is then fed into the hopperized container through the hatch 15, and when the load is to be discharged, the dumping hatch 17 is opened.

Also provided are openings in the side panels 18 and 19 (not shown) to accommodate the tines of a fork lift whereby the box may be raised onto a flat car or a truck trailer. Fittings may also be provided (not shown) at the upper corners of the box so that the box may be lifted by hoisting cables onto a ship.

In one practical embodiment, the box dimensions are 8′ wide x 8′ high and 10′ long. When hopperized, the boxes have inside measurements of 428 cubic feet, but when the hopper sections 21B and 22B are raised, the inner capacity is 506 cubic feet. The 10-foot length of this box makes it suitable for crosswise loading on rail flat cars. The boxes may also be equipped with adjustable vents for both natural and forced-draft ventilation, where required. Under certain conditions the boxes can be placed on legs, thereby permitting long-term storage without tying up expensive mobility equipment.

The bag 11 for liquid loads, as shown separately in FIG. 3, is of generally rectangular shape and is fabricated of synthetic plastic sheeting material, such as polyethylene or vinyl material of adequate strength for the intended load. The choice of the plastic material depends not only on the required mechanical properties but also on the chemical nature of the liquid load, and it is important that the material be non-reactive with respect to the load. In practice, the seams of the bag are heat-sealed and suitably reinforced, with additional reinforcement at the eight corners of the bag.

Secured to the upper panel 25 of the bag at a central position thereon is the end of a hose or tubular spout 26 which communicates with the interior of the bag, this spout acting as the liquid loading spout. Similarly, secured to the bottom panel 27 of the bag is an outlet spout 28 serving for gravity liquid discharge. Attached to the upper edge of the bag at the corners and at intermediate points are six straps 29 provided with eyelets, the straps being intended for suspending the bag within the box. A gas escape valve 30 is mounted in the top panel 25.

When the container is to be used for liquid cargo, the hopper 24 is retracted, as shown in FIG. 4, the sections 21B and 22B being raised to form the side walls. The dimensions of the bag correspond substantially to the internal dimensions of the de-hopperized box, except that the height of the bag is lower than that of the box. Since the unfilled bag is collapsed, it is first necessary in order to facilitate filling, to suspend it within the box, this being done by means of double hooks 31 which engage the eyelets in the straps 29, the other end of the hooks being placed over horizontal strips 32 attached to the upper end of the vertical ribs 20 on either side of the box.

The loading hatch 15 is opened and the intake spout 26 is brought therethrough to engage a liquid line 33 by means of a coupling element 34. The discharge spout is sealed, this being accomplished simply by folding the spout and tying it with a suitable band 35. After the bag is filled with liquid, the intake spout is folded and sealed by a band 36, as shown in FIG. 6, as the loading hatch is closed. Since the plastic bag is surrounded by the box, the liquid load therein is effectively supported by the rigid box structure, rather than by plastic material, so that the bag acts effectively as a leakproof liner for the box. When the container reaches its destination, the dumping hatch is opened, as shown in FIG. 7, and the discharge spout 28 is extended therethrough to unload the liquid cargo.

When liquid is fed into the bag, the air therein is displaced and exhausted through valve 30, and when liquid is discharged from the bag, air is drawn therein through the valve. The operating point of the valve is made such as to prevent liquid leakage.

It will be appreciated that once the liquid load is discharged the bag may readily be removed from the box and the box is then useable for dry loads. The bags are relatively inexpensive and are disposable, so that a new liquid load may be introduced into a new bag without the need to clean liquid tanks, as is often the case with conventional arrangements.

While the container has been described as a dual-purpose device for dry bulk and liquid loads, it can also be used for packaged dry cargo with the hopper retracted. Thus the container is ideally suited for containerized ships, for it is capable of carrying all forms of cargo.

While there has been shown and described a preferred embodiment of dual-purpose shipping container in accordance with the invention, it is to be understood that many changes and modifications may be made therein without departing from the essential spirit of the invention as defined in the annexed claims.

What I claim is:

1. A dual-purpose container comprising a box having a top loading hatch, a bottom dumping hatch, and a retractable hopper which in the operative position directs a dry bulk load toward the dumping hatch and in the inoperative position forms side walls within the box, and a removable bag of flexible material for holding a liquid load and receivable in said box when the hopper is inoperative, said bag having an inlet spout which is extendible through said loading hatch, and an outlet spout which is extendible through said dumping hatch.

2. A dual-purpose container for dry and liquid cargo, said container comprising:
   (A) a rectangular box including,
      (a) a loading hatch disposed at the top of the box,
      (b) a dumping hatch disposed at the bottom of the box, and
      (c) a retractable hopper which in the operative position directs a dry bulk load toward said dumping hatch and in an inoperative position defines internal side walls within said box, and
   (B) a flexible bag of rectangular form receivable in said box when the hopper is inoperative.

3. A dual-purpose container as set forth in claim 2, wherein said bag includes an inlet spout secured to the top of said bag and extendible through said loading hatch, and an outlet spout secured to the bottom of said bag and extendible through said discharge hatch.

4. A container as set forth in claim 2, said retractable hopper being constituted by a pair of hinged wall sections which when lowered are inclined to define an operative chute leading to said dumping hatch and when raised define internal side walls in said box.

5. A container as set forth in claim 2, wherein said box includes a pair of hinged doors on the part of the box providing access thereto.

6. A container as set forth in claim 2, wherein said bag further includes a relief valve to permit discharge of air when the bag is filled and to permit air to be drawn in when the bag is being emptied.

7. A dual-purpose container for dry and liquid cargo, said container comprising:
   (A) a rectangular box including,
      (a) a loading hatch disposed at the top of the box,
      (b) a dumping hatch disposed at the bottom of the box,
      (c) a retractable hopper constituted by a pair of hinged wall sections which when lowered are inclined to define a hopper leading to said dumping hatch and which when raised to an operative position define internal side walls within said box, and
      (d) a pair of hinged doors at the front end of the box providing access thereto, and
   (B) a flexible bag of rectangular form receivable in said box when the hopper is inoperative, said bag being formed of a material impervious to the liquid cargo and including:
      (a) an inlet spout secured to the top of said bag and extendible through said loading hatch,
      (b) an outlet spout secured to the bottom of said bag and extendible through said discharge hatch,
      (c) straps secured to the upper end of said bag for suspending same within the box, and
      (d) a relief valve to permit discharge of air and the intake thereof.

References Cited

UNITED STATES PATENTS

| | | | |
|---|---|---|---|
| 2,618,409 | 11/1952 | Eisenberger et al. | 220—63 |
| 2,712,797 | 7/1955 | Woehrle et al. | 220—63 |
| 3,105,617 | 10/1963 | Felldin | 220—63 |

M. CARY NELSON, *Primary Examiner.*

W. CLINE, *Assistant Examiner.*